United States Patent [19]

Nichols

[11] Patent Number: 5,535,571
[45] Date of Patent: Jul. 16, 1996

[54] AUTOMOTIVE INTERIOR TRIM PANEL WITH POCKET EDGE MOLDING

[75] Inventor: Lawrence R. Nichols, Dover, N.H.

[73] Assignee: Davidson Textron Inc., Dover, N.H.

[21] Appl. No.: 520,481

[22] Filed: Aug. 29, 1995

[51] Int. Cl.$^6$ .................................. F04C 2/38; B60J 5/04
[52] U.S. Cl. ..................... 52/716.6; 52/718.04; 52/288.1; 296/37.13; 296/152; 49/502; 428/31
[58] Field of Search .................................. 296/37.13, 152, 296/37.8, 146.7; 52/716.1, 716.5, 716.6, 718.01, 718.04; 428/192, 133, 31, 60, 122; 248/345.1; 49/502, 503; 156/256, 144.25; 264/276

[56] References Cited

U.S. PATENT DOCUMENTS

| | | | |
|---|---|---|---|
| 3,086,216 | 4/1963 | Brooks et al. | 156/244.25 X |
| 3,358,725 | 12/1967 | Bussard et al. | 248/345.1 X |
| 3,730,581 | 5/1973 | Parkinson | 296/37 R |
| 3,825,459 | 7/1974 | Taylor | 156/244.25 X |
| 4,265,383 | 5/1981 | Ferguson | 224/326 |
| 4,619,477 | 10/1986 | Kneib et al. | 296/37.13 |
| 4,935,269 | 6/1990 | Fisher et al. | 52/716.5 X |
| 5,009,458 | 4/1991 | Shute | 296/37.13 |
| 5,076,636 | 12/1991 | Buck et al. | 296/152 X |
| 5,111,619 | 5/1992 | Billin et al. | 296/152 X |
| 5,141,577 | 8/1992 | Porchia et al. | 156/244.15 X |
| 5,261,716 | 11/1993 | Phelps | 296/37.8 |

FOREIGN PATENT DOCUMENTS

| | | | |
|---|---|---|---|
| 1140005 | 7/1957 | France | 296/37.13 |
| 6270672 | 9/1994 | Japan | 296/146.7 |
| 1305189 | 6/1969 | United Kingdom | B60R 13/02 |

*Primary Examiner*—Wynn E. Wood
*Assistant Examiner*—Winnie Yip
*Attorney, Agent, or Firm*—Reising, Ethington, Barnard & Perry

[57] ABSTRACT

A thermoplastic automotive interior trim panel of uniform wall thickness has an integral outwardly projecting storage pocket of complex curvature to which is added an extruded elastomeric thermoplastic edge molding to form a relatively large smooth rounded edge at the opening to the pocket. A top margin of the pocket is curved inward so that the pocket edge faces inward and the edge molding is held in place by internal ribs that snap onto locking tabs formed integral with the curved top pocket margin at locations spaced therealong. In one embodiment, the locking tabs are located on the sides of the top margin of the pocket at the pocket edge and the edge molding extends completely over this edge to be located thereby. In another embodiment, the molding abuts with the top edge of the pocket, the locking tabs are formed integral with the sides of a locking/locating rib on the inner side of the pocket that also cooperates with the ribs to properly locate the molding, and a convex surface on the molding cooperates with a convex surface on the pocket to form a relatively large rounded edge on the pocket. In both embodiments, the locking tabs are divided into two sets that project in opposite directions and with those in one set staggered in relation to those in the other set to facilitate their molding.

17 Claims, 5 Drawing Sheets

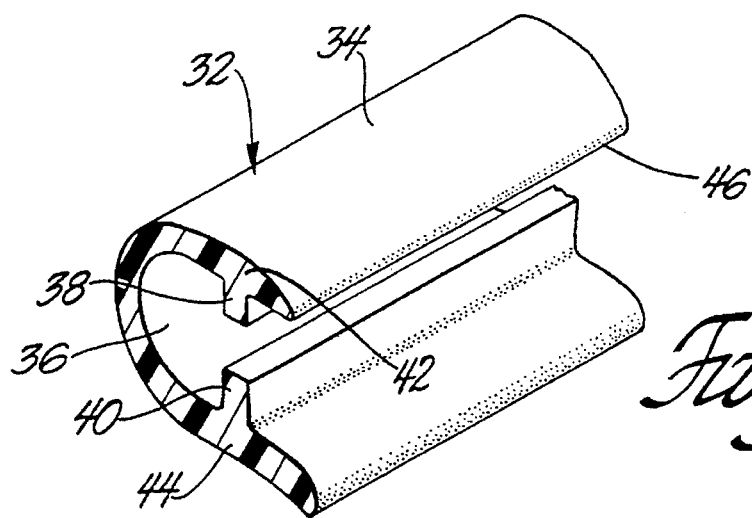
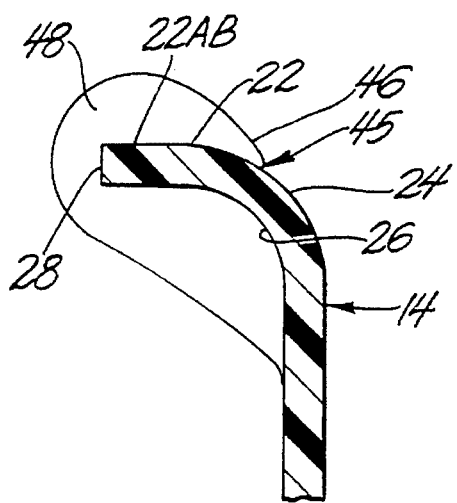
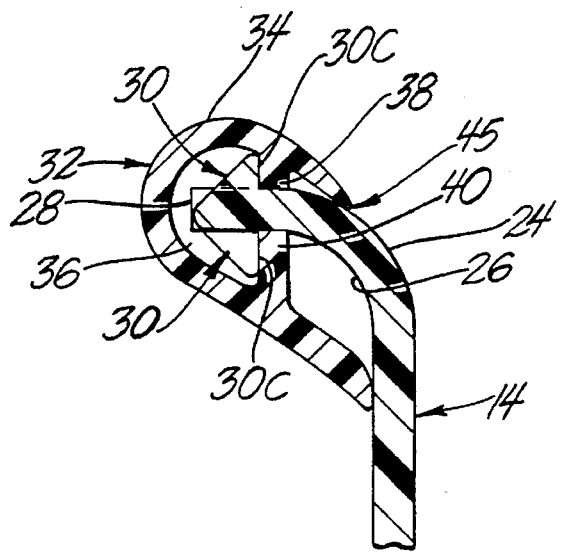
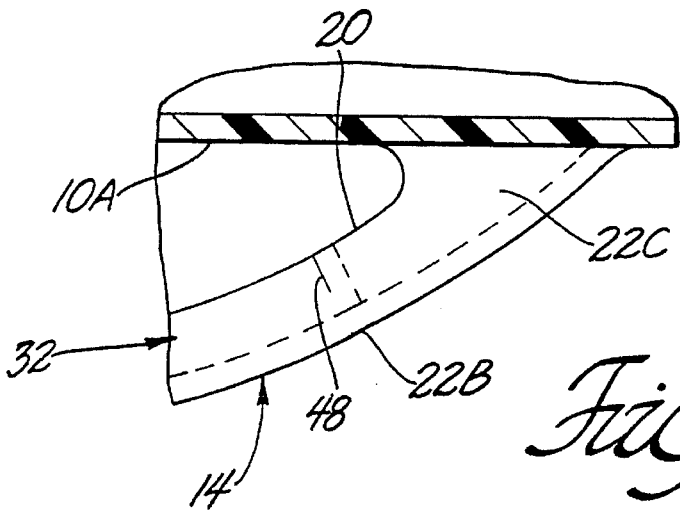

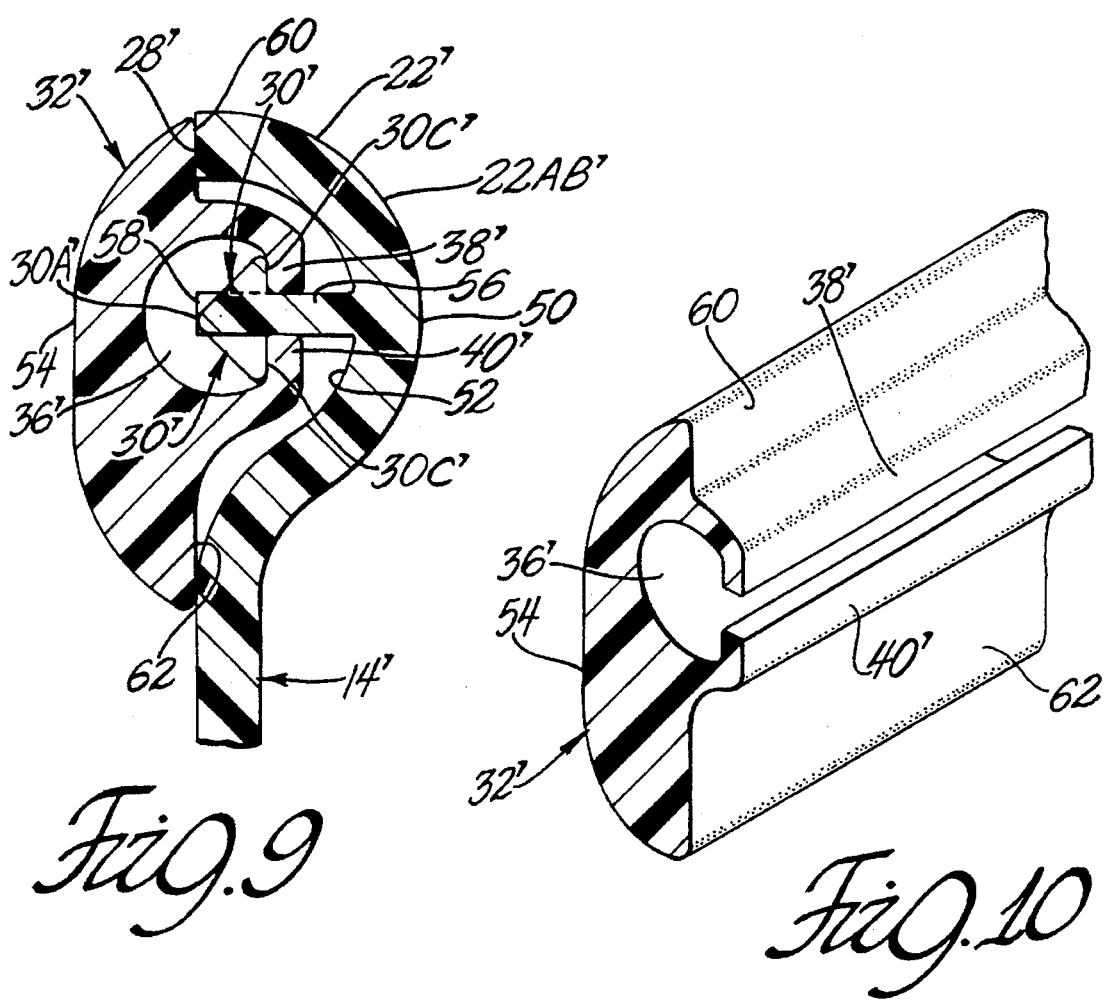

AUTOMOTIVE INTERIOR TRIM PANEL WITH POCKET EDGE MOLDING

TECHNICAL FIELD

This invention relates to automotive interior trim panels having an integral storage pocket and more particularly to the formation of a large rounded edge on the pocket.

BACKGROUND OF THE INVENTION

It is common practice to mold automotive interior door trim panels of a thermoplastic material and with an integral pocket for the storage of items such as maps and other small goods for the convenience of the passenger seated next thereto. In the design of the pocket, the outer corner edge of the pocket is typically provided with a radius for a smooth comfortable feel but the inner corner edge may not be as that can present a problem in leaving the pocket edge with a completely smooth surface as molded. When only a front corner edge radius is provided, the parting line is located at the back side of the pocket wall and thus at the back corner edge of the pocket. The rear corner edge is left without a radius at the parting line to allow release of the panel from the mold, and while this results in a relatively sharp rear corner edge on the pocket, there is thus no parting line with possible flash and a parting line mark or ridge between the rounded front corner edge and the rear corner edge over the full wall thickness of the pocket. This front corner radius can extend from the front side of the pocket wall to the rear side and is used to advantage to make the pocket edge appear to have more bulk than the actual wall thickness for styling purposes. But the inner corner edge without a radius can be felt in a disturbing manner by a person's finger tips when retrieving an item in the pocket and the present invention is directed to eliminating this problem.

The inner corner edge as well as the outer corner edge of the pocket can be molded with a radius but this requires that the parting line in the mold be located between the two rounded corner edges. As a result, flash can occur along a line between the smooth corner edges and/or there may be left a distinct parting mark or ridge at this location that disrupts the pocket edge surface. And the thickness of the pocket edge may or may not be increased with respect to the nominal wall thickness to add bulk for strength as well as styling appearance. However, there is a limit as to the increased thickness that can be provided at the edge of the pocket because of warpage caused by shrinkage of the injected molten thermoplastic material on cooling.

Furthermore, the edge of the pocket may be flared for styling purposes at one or both ends where the pocket edge joins with the main body of the panel. And this presents a problem in attempting to add a large fully rounded edge in a supplementary way between these flared portions without adversely detracting from the integrity of the pocket edge where it starts to flare. The design goal is to minimize modifications of the molded pocket to enhance its edge at least in balance with the value of the advantages gained.

SUMMARY OF THE INVENTION

The present invention allows the maintenance of nominal panel wall thickness in the pocket to avoid a shrinkage problem while providing a large smooth rounded pocket edge that can significantly exceed in size or bulk what is obtainable by increasing wall thickness at the edge before shrinkage problems develop. This is accomplished by the addition of a low cost extruded elastomeric thermoplastic edge molding to a modified top edge portion of the pocket that is adapted to retain the molding and cooperate therewith to form a very bulking appearing rounded edge on the pocket. A top margin of the pocket containing the pocket edge is formed with an inward curvature so that the pocket edge faces inward. And the edge molding is provided with resilient locking ribs on an inner side that snap onto locking tabs or hooks that are formed integral with and spaced along this curved top margin of the pocket. In one embodiment, the locking tabs are formed integral with the sides of the top margin of the pocket at the pocket edge and the molding extends completely over the inwardly directed pocket edge to be located properly in place. In another embodiment, the curved top pocket margin is formed with a semi-circular cross-section and an edge of the molding abuts with the pocket edge. The locking tabs in this embodiment are provided on the sides of a locking/locating rib that is formed integral with and projects from the inner side of the pocket margin. And the locking/locating rib cooperates with the snap-locking ribs to locate as well as lock the molding in place. The molding does not extend over the edge of the pocket in this embodiment and instead the convex surface on the molding cooperates with the convex surface of the pocket margin on the outer side to form a very bulking appearing large rounded edge on the pocket.

In both embodiments, the locking tabs are divided into two sets that project in opposite directions and with those in one set staggered in relation to those in the other set to facilitate their formation in an injection mold. In addition, the inner side of the extruded molding in both embodiments is formed with a cavity inward of the snap-locking ribs and these ribs deflect outward when the edge molding is pushed onto the locking tabs and then snap back to capture the locking tabs in the cavity and tightly retain the molding in place on the edge of the pocket. The edge molding is accurately located on the pocket by the edge molding ribs which in the one embodiment accomplish this by receiving the sides of the pocket along the pocket edge with a clamping action and in the other embodiment by receiving the locking/locating rib with a similar clamping action. By forming and attaching the edge molding in this manner, there is thus no need to form a radius on either corner edge of the pocket or increase the nominal wall thickness at the pocket edge to add strength or bulk where the molding is attached. To the contrary, this edge is maintained at nominal wall thickness to avoid any shrinkage problem and actually used to advantage without a radius at the outer corner edge in the one embodiment to assist in forming a smooth uninterrupted rounded edge of relatively large radius.

Where the pocket edge flares for styling reasons at one or both ends of the this edge, a thin vertical close-off rib is formed integral with the inner side of the pocket at the beginning of each such flare to close off or cover the cut end of the added edge molding. The close-off rib is formed with a shape conforming to the cross-sectional outline of the edge molding and the associated end of the latter is cut so as to flatly abut therewith and not be exposed as a raw end. Furthermore, the pocket edge molding of the present invention offers the advantage of being compatible with the door panel material for strength and color matching and assists in retaining the curved shape of the pocket.

It is therefore an object of the present invention to provide a new and improved automotive interior trim panel having an integrally molded storage pocket with an extruded elastomeric thermoplastic edge molding.

Another object is to provide a thermoplastic automotive interior trim panel having an integrally molded storage pocket with an enlarged rounded edge formed by an extruded elastomeric thermoplastic edge molding that snap locks onto the edge of the pocket.

Another object is to provide a molded thermoplastic automotive interior trim panel having an integral pocket and an extruded elastomeric thermoplastic edge molding that snaps onto locking tabs at along the pocket edge margin and provides a smooth rounded pocket edge that is significantly thicker than the nominal wall thickness of the panel.

Another object is to provide a molded thermoplastic automotive interior trim panel having an integral pocket with an extruded elastomeric thermoplastic edge molding snap fitted to locking tabs on the edge of the pocket and abutting at one or both of its ends with a close off rib formed integral with the inner side of the pocket at a location where the pocket edge starts to flare.

These and other objects, advantages and features of the present invention will become more apparent from following description and drawing wherein:

BRIEF DESCRIPTION OF THE DRAWINGS

FIG. 5 is a partial perspective view of the edge molding in FIG. 1 as extruded;

FIG. 6 is an enlarged view taken on the line 6—6 in FIG. 3 when looking in the direction of the arrows;

FIG. 7 is an enlarged view taken on the line 7—7 in FIG. 2 when looking in the direction of the arrows;

FIG. 8 is a view like FIG. 2 but showing the end of the edge molding at the starting point of the pocket flare cut at right angles to the molding and out of the line of the draw of the mold for the panel;

FIG. 9 is a view similar to FIG. 7 but of another embodiment of the pocket edge and edge molding according to the present invention;

FIG. 10 is a partial perspective view of the edge molding in FIG. 9 as extruded;

DETAILED DESCRIPTION OF THE DRAWINGS

Figure 1:
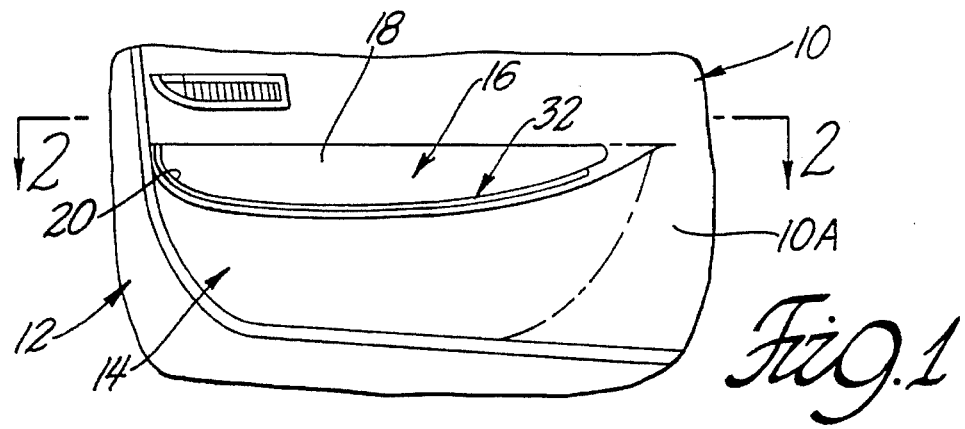
FIG. 1 is a partial perspective view of a motor vehicle driver-side door having a lower trim panel with a storage pocket having an edge and edge molding according to one embodiment of the present invention.
Figure 2:
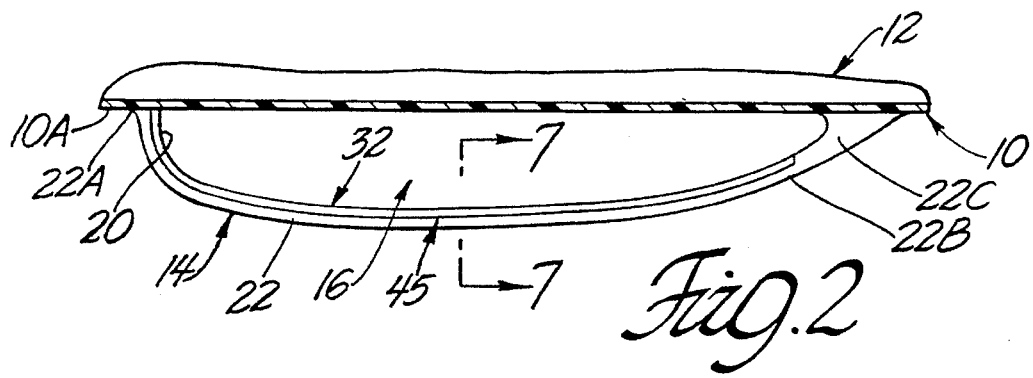
FIG. 2 is a top plan view of the pocket in FIG. 1.

Referring to FIGS. 1 and 2, there is illustrated a portion of a plastic injection molded trim panel 10 mounted on a lower portion of the inner side of a driver-side door 12 of an automobile. The door trim panel 10 is made of a tough thermoplastic material, such as acrylonitrile-butadiene-styrene (ABS) or polypropylene (PP) and has a storage pocket 14 integrally formed therewith; the pocket being commonly referred to as a map pocket as it provides for the convenient storage of maps next to the adjacent passenger seat. The panel 10 including the pocket 14 has a uniform wall thickness as illustrated in FIGS. 2, 3, 4, 6 and 7 with the pocket projecting outwardly of the generally vertical and planar main body 10A of the panel to form a storage space 16 for maps and other items. In the molding of the pocket, an opening is left in the main body of the trim panel opposite the pocket and a close-out plate 18 is attached to the backside of the trim panel as illustrated in FIG. 1 to cover this opening and form the back side of the pocket. The pocket is closed at its bottom by its integral formation with the generally vertical main body 10A of the panel and has a top opening 20 that is sized to accommodate a person's hand.

Figure 3:
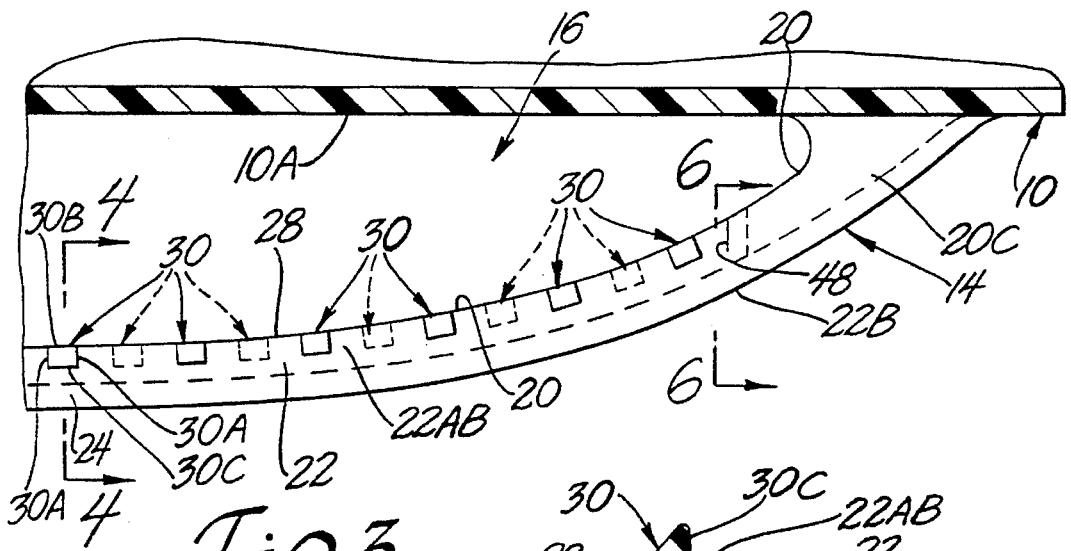
FIG. 3 is an enlarged view of the forward end of the pocket in FIG. 2 with the edge molding removed.
Figure 4:
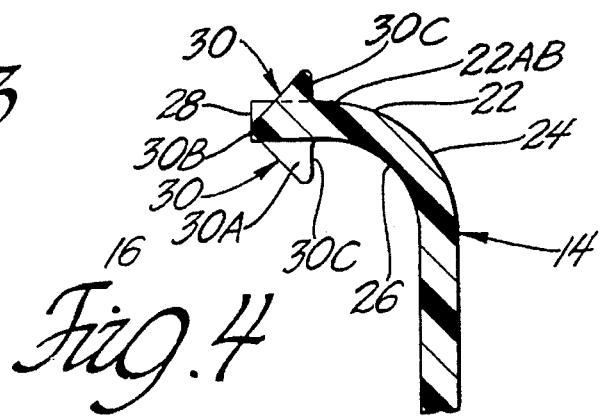
FIG. 4 is an enlarged view taken on the line 4—4 in FIG. 3 when looking in the direction of the arrows.

Referring to FIGS. 2 and 3, the pocket opening 20 at the top of the pocket is defined on the front side by a horizontal edge portion or margin 22 of complex curvature that is curved in a horizontal geometric plane to join at its opposite ends with the main body of the panel. The curved edge portion 22 is of uniform width along the top margin of the pocket from point 22A at the plane of the main body 10A of the panel to a point 22B where the curved edge portion then flares in width at the forward end of the pocket for styling purposes before joining with the main body of the panel. The top edge portion or margin 22AB between points 22A and 22B is also curved in vertical geometric planes and is defined in cross-section by a convex outer side 24 and a concave inner side 26 and an edge 28 as illustrated in FIG. 4. The edge 28 extends between the sides 24 and 26 at right angles thereto and the edge portion 22AB is curved inward in a horizontal plane so that the edge 28 is vertical and faces inward toward the back side of the pocket as illustrated in FIGS. 3, 4 and 6.

As illustrated in FIGS. 3 and 4, a plurality of equally spaced wedge-shaped locking tabs or hooks 30 are integrally formed with and project vertically from the upwardly and downwardly facing sides of the top margin portion 22AB. The locking tabs have parallel vertical sides 30A and are spaced along the length of the top margin portion and with those on one side of the top margin 22AB forming one set that is evenly staggered with respect to those in another set on the other side to facilitate their formation in an injection mold as described later. The locking tabs 30 have a pointed end 30B coextensive with the pocket edge 28 that is directed or pointed inward of the pocket and a wide locking end at their rear end defined by a flat rear edge 30C that projects in a vertical plane from the curved pocket edge portion 22AB.

An extruded pocket edge molding 32 that is substantially wider than the nominal wall thickness of the panel including the pocket is tightly attached to the curved edge portion 22AB by the locking tabs 30. The pocket edge molding is made of an elastomeric thermoplastic material such as extrudable polyvinyl chloride in a conventional type extrusion process and in a color that matches the door trim panel. The pocket edge molding is extruded in straight lengths as illustrated in FIG. 5 and with a uniform cross-section of generally U-shape that includes a rounded or convex outer side 34 and an inner attaching side defining a tab locking cavity 36 with adjoining tab capturing ribs 38 and 40 wherein the latter project inwardly toward each other from outer wall portions 42 and 44 of the molding. The ribs 38 and 40 directly oppose each other to form a restricted channel to the cavity 36 of less width than the pocket wall thickness and are adapted to be deflected apart or outward by the wedge-shape of the locking tabs on pushing or pressing the molding onto the pointed ends 30B of the locking tabs 30 over the curved edge portion 22AB of the pocket. The tab capturing ribs 38 and 40 are deflected sufficiently outward by pushing action on the molding to allow the locking tabs 30 to enter the molding cavity 36 whereafter the ribs then snap back against the opposite sides of the curved pocket edge portion 22AB as illustrated in FIG. 7 to capture the locking tabs at their rear edge 30C in the cavity 36 and clamp onto the pocket wall to thereby tightly attach the molding to the complex curved edge portion in conforming curved relationship therewith and wherein the molding is located in aligned relationship therewith along the length thereof by the tight or pressed engagement of the snap-locking ribs with a molding locating portion of the pocket defined by the opposite sides of the curved edge portion 22AB.

The wall portions 42 and 44 of the molding outward of the respective snap-locking ribs 38 and 40 are spaced apart so as to also have an interference fit with the pocket edge portion 22AB and thus clamp thereon in addition to the molding snap fitting onto the locking tabs with the snap-locking ribs and the clamping action of these ribs on the sides of the curved edge portion. The seam 45 between the molding and the outer side of the pocket is visible and the upper oriented wall portion 42 is formed on its appearance side to its edge 46 at this seam so as to smoothly blend in curvature with the outer side of the curved pocket edge portion along the top margin thereof to form a continuous smooth convex surface at this visible seam location. The lower oriented wall portion 44 of the molding is also configured to smoothly blend with the pocket at the inner side thereof but at a location below the curved edge portion 22AB to avoid having to conform therewith in its varying concave curvature laying in vertical planes and this is accomplished by making the lower wall portion 44 wider than the upper wall portion 42 and of sufficient width to span this curvature as illustrated in FIG. 7. The molding 32 thus extends completely over the pocket edge 28 from the outer side of the curved pocket edge portion 22AB to the inner side of pocket below this curved portion to provide a large smooth rounded edge at the top opening of the pocket along this intermediate section that is substantially wider or thicker than the panel thickness. The molding also possesses a significant degree of stiffness and by its attachment to the curved edge portion 22AB adds strength to this portion in a reinforcing manner to help hold the shape of the pocket.

The top opening 20 of the pocket is further defined by a flared edge portion 22C that extends from point 22B to the main body of the trim panel at the forward end of the pocket. The molding extends from the main body of the panel at point 22A to the beginning of this flare at point 22B where it abuts with and is closed off by a vertical close-off rib 48 formed integral with the inner side of the flared edge portion as illustrated in FIGS. 3 and 6. The close-off rib 48 has a shape conforming to that of the cross-sectional outline of the molding and is preferably aligned with the line of draw of the injection mold used to mold the panel to simplify the mold construction. This locates the close-off rib at an oblique angle with respect to the pocket edge and the molding is cut to match this angle. Alternatively, the close-out rib 48 may be formed at right angles to the pocket edge to provide for a square cut molding as illustrated in FIG. 8 and in which case the injection mold for molding the panel is provided with suitable conventional type action cores to form a mold cavity for the angled close-out rib and then allow its release following the molding of the panel. In either case, the edge molding 32 is cut from a length of extruded stock to extend the necessary length and to have an end that conforms and flatly abuts with the close-off rib 48 in a tight joint. The rear end of the pocket edge does not have such a flare and the respective end of the molding is cut off accordingly so as to be closed off by the main body of the panel as illustrated. It will also be understood that where there is also a flare at the rear end of the pocket, a similar close-off rib can be added at this location and at whatever angle is desired. On the other hand, where there is no flare at either end, the close-off rib or ribs may be omitted with both ends of the molding then closed off at the main body of the panel.

Another embodiment utilizing the molded pocket to help form a relatively large rounded pocket edge is illustrated in FIGS. 9 and 10 wherein parts and features similar to those previously described are identified by the same numbers only primed and significantly different features are identified with new numbers. In this embodiment, the curved edge portion 22AB' of the pocket has an edge 28' that is vertical and faces inward like in the previous embodiment but the pocket edge margin is now formed with a radius so as to have a substantially semi-circular convex outer side 50 and a parallel concave inner side 52 which are joined by the edge 28'. The molding 32' is formed with a convex outer side 54 without wall extensions as in the previous embodiment and with an inner attaching side that includes a tab locking cavity 36' like in the previous embodiment with adjoining deflectable tab locking ribs 38' and 40' that snap lock onto locking tabs 30'. But the locking tabs 30' on the pocket are now formed integral with the sides of a locking/locating rib 56 that is formed integral with and extends horizontally from the concave inner side 52 of the pocket edge portion 22AB'. The rib 56 is located at the center of the concave inner side 52 and extends the length of the pocket edge portion 22AB' parallel to the pocket edge 28'.

The locking tabs 30' on the sides of the rib 56 are spaced and staggered like in the previously described embodiment but with their pointed end 30A' now coextensive with the edge 58 of this rib. In addition, the snap-locking ribs 38' and 40' on the molding are now independent of the appearance portion of the molding and are formed with an arcuate shape in cross-section to fit or nest in the concave inner side 52 of the pocket edge portion 22AB'. The locking tab capturing cavity 36' is located centrally of the molding as before and the inner attaching side of the latter is further formed with extruded co-planar edges 60 and 62 of uniform but different widths on opposite sides of the snap-locking ribs 38' and 40'. The molding 32' is pushed onto the locking tabs 30' to deflect the locking ribs 38' and 40' outward as before but now these ribs engage the locking/locating rib 56 which acts through this engagement as a molding locating portion of the pocket to align the molding with respect to the pocket edge 28'. The rib 56 may have the same thickness as the panel including the pocket but is preferably thinner as illustrated to minimize both its size and the attaching portion 36', 38' and 40' of the molding.

The molding edges 60 and 62 are drawn tightly into contact with the plain edge 28' and the inner side of the pocket, respectively, on the snap fitting of the molding onto the locking tabs 30'. And the width of the edge 62 is made wider than the edge 60 so as to span the inner concave surface 52 of the curved edge portion 22AB' so as to engage the inner side of the pocket along a plane curved complementary portion of the pocket adjacent the complex curved edge portion. In the assembled position, the convex surface 50 of the pocket edge and the convex surface 54 of the molding 32' cooperate to form a very large rounded edge on the pocket having a width or thickness substantially greater than that of the pocket wall (for example about five times greater as illustrated). And it will be understood that a close-out rib like that previously described but with the outline of the cross-section of the molding 32' is added as a feature to the pocket where the pocket edge flares to close off this end of the molding 32'.

Figure 11:
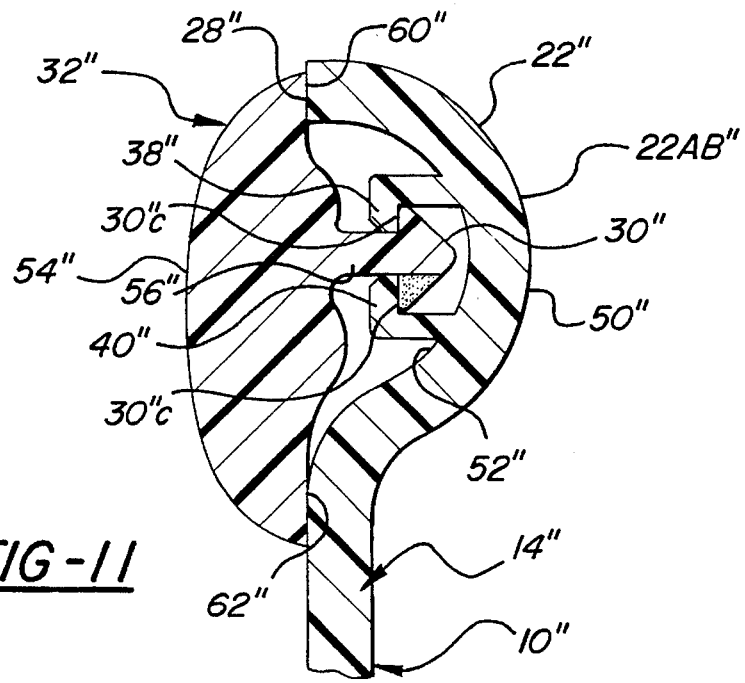
FIG. 11 is a view similar to FIGS. 7 and 9 but of another embodiment of the pocket edge and edge molding according to the present invention.

A third embodiment using the molded pocket to help form a relatively large rounded pocket edge is illustrated in FIG. 11. In FIG. 11 all the parts and features are similar to those in the embodiment of FIGS. 9 and 10 and are identified by the same numbers only double-primed. In this embodiment the locking/locating rib 56" extends horizontally from the molding 32" rather than from the pocket edge portion 22AB". Correspondingly, the tab locking cavity 36" and deflectable tab locking ribs 38", 40" extend from the concave inner side 52" of the pocket edge portion 22AB" rather than the molding 32". The rib 56" extends the length of the molding 32".

Figure 14:
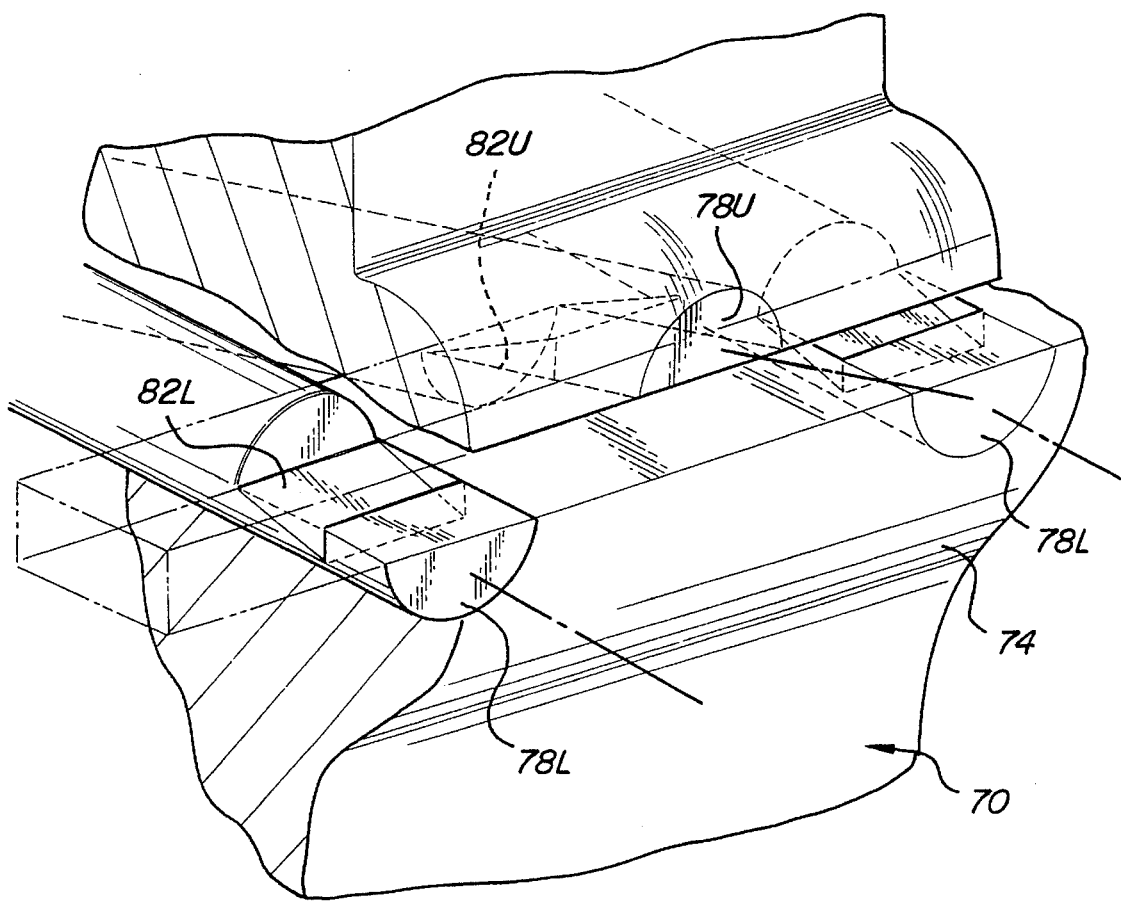
FIG. 14 is a fragmentary perspective view of the moveable mold tool with the core pins retracted.
Figure 12:
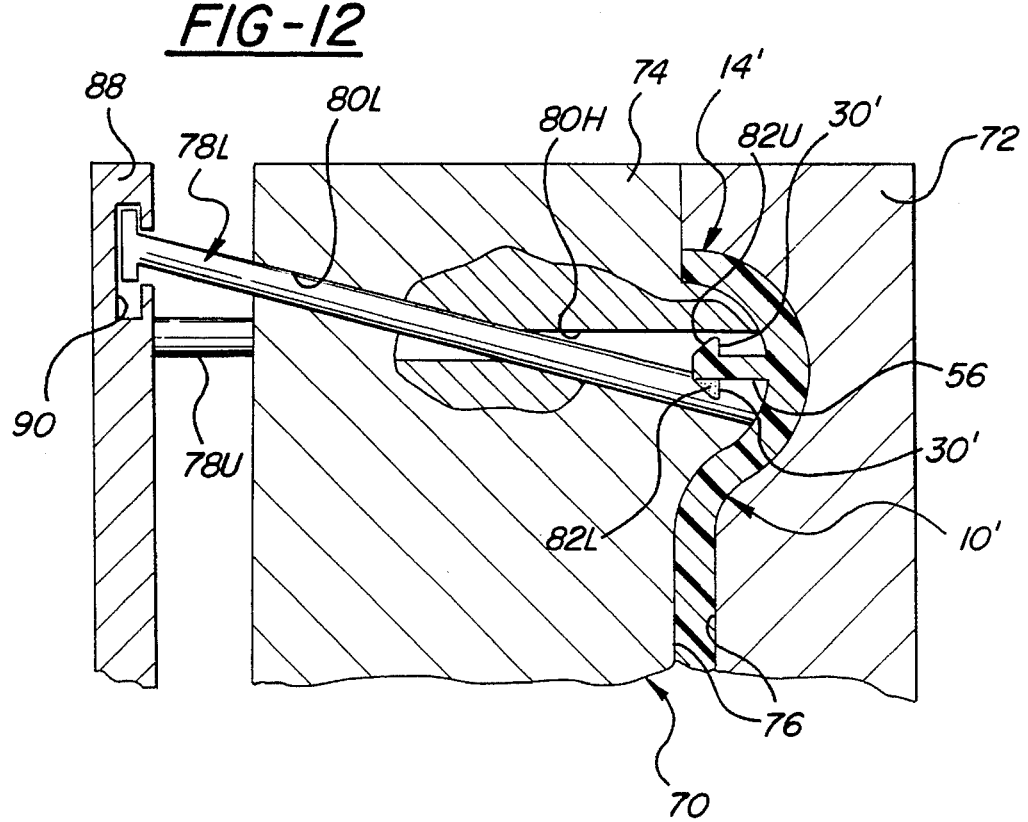
FIG. 12 is a fragmentary, partial cut-away, cross-sectional end view of a mold containing the door trim panel of FIG. 1 between a stationary mold portion and a relatively moveable mold portion.
Figure 13:
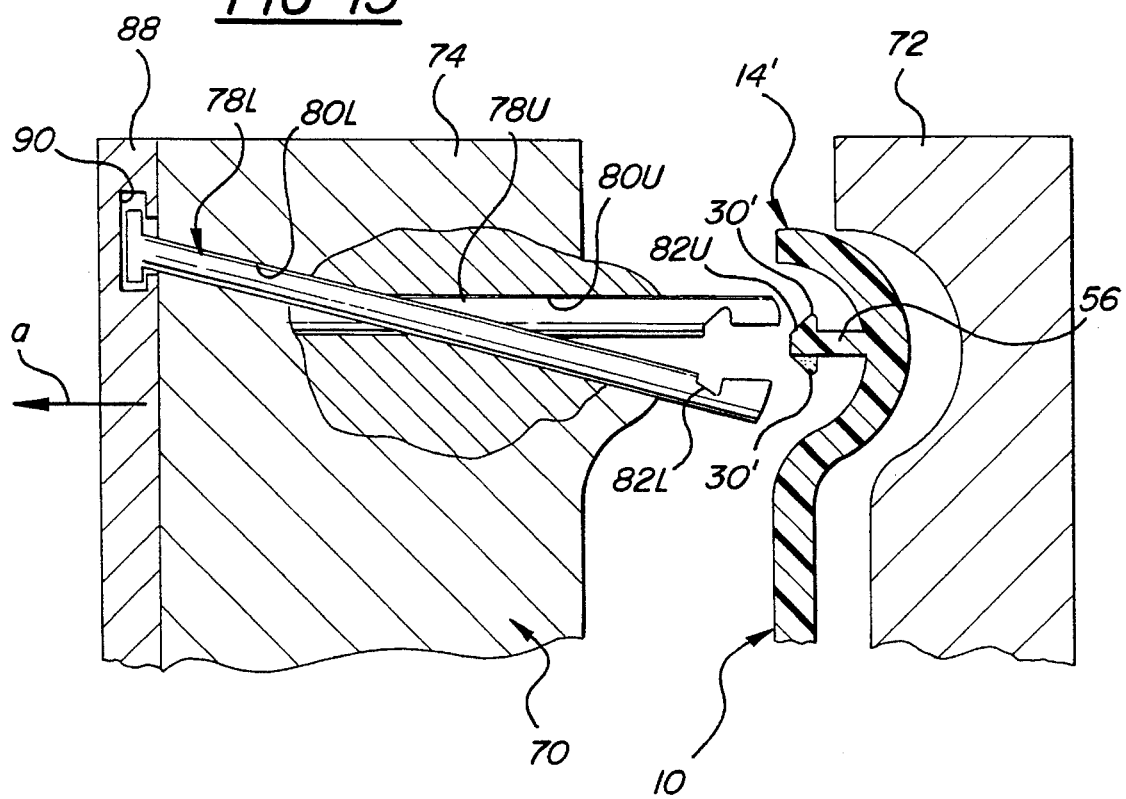
FIG. 13 is a view similar to FIG. 12 but showing the movable mold portion moved away from the stationary mold portion and the door trim panel being ejected from the moveable portion of the mold by the core pins.

In each of the three embodiments above, the panel 10, 10', 10" is designed to be molded in an injection mold with a parting line located at the pocket edge 28, 28', 28". The design of an injection mold for producing the panel with an integral pocket having the features described above may take various forms in accordance with conventional injection mold design practices and particularly with respect to the molding of the locking tabs. To illustrate how these tabs may be readily formed in an injection mold, there is illustrated in FIGS. 12, 13 and 14 a mold 70 for molding the panel 10' with the pocket 14' and locking tabs 30' shown in FIGS. 9 and 10. The mold 70 generally comprises a stationary mold tool 72 and a relatively moveable mold tool 74 which co-operatively define a mold cavity 76 into which the molten thermoplastic material is injected under high pressure to form the door trim panel with pocket 14'. FIGS. 12 and 13 are representative cross-sectional views at one of the locking tab 30' locations and illustrate how the cavities for molding the locking tabs 30' are formed with the aid of upper 78U and lower 78L notched core pins commonly referred to as "knockout" core pins. Cutaway portions in each of FIGS. 12 and 13 show one of the upper core pins 78U disposed behind one of the lower core pins 78L. FIG. 14 is a perspective view showing the convex face of the moveable mold tool 74. FIG. 14 also shows the ends of the core pins 78U, 78L in their retracted positions—flush with the convex face of the moveable mold tool 74.

The upper 78U core pin is horizontally and slidably disposed in a horizontal bore 80H through the moveable tool 74 with one flanged end fixed or locked in a suitable conventional type ejector plate 88. The lower core pin 78L is diagonally and slidably disposed in a diagonal bore 80D through the moveable tool 74 with one flanged end slidably retained in a sliding chamber 90 within the ejector plate 88. The lower core pins 78L are mounted diagonally through the movable tool 74 so as to be out of the line of draw of the mold shown by arrowed line "a" in FIG. 13. The sliding chamber 90 allows the flanged end of the lower core pin 78L to move downward as the ejector plate 88 moves toward the moveable tool 74.

The upper 78U and lower 78L core pins respectively have a notched portion 82U, 82L that cooperates with the movable mold tool 74 to define tab locking mold cavity portions 84 for molding the locking tabs 30' and the upper side of the locking/locating rib 56 and the inner side of the pocket 14' at this location. Similar knockout core pins are disposed at spaced and oppositely staggered locations along the moveable tool 74. These core pins are operated and used in a similar manner as those depicted in FIGS. 12–14 to mold the other locking tabs 30' on the interior side of the pocket 14' at their spaced and oppositely staggered locations on the sides of the rib 56 and below the pocket edge.

Following injection and cooling, the mold 70 opens with the panel 10' held to the moveable tool 74 as the moveable tool 74 moves away from the stationary tool 72. As is best shown in FIG. 13, the ejector plate 88 then moves toward the moveable tool 74 pushing the core pins 78U, 78L through the moveable tool 74. The core pins 78U, 78L push the panel 10' away from the moveable tool 74. The diagonal disposition of the lower core pins 78L causes the notched portions 82U, 82L of the upper 78U and lower 78L pins to splay apart from each other as the ejector plate 88 moves toward the mold 70 pushing the pins 78U, 78L out from the moveable tool 74. This splaying causes the notched portions 82U, 82L of the core pins 78U, 78L to release the locking tabs 30'.

An injection mold for molding the panel pocket 14' with locking tabs 30' may also include an upper core pin 78U that, rather than being horizontally disposed through the moveable tool 74, is diagonally disposed with the end including its notched portion 83U angled upward. In molds including a diagonally disposed upper core pin 78U of this type, the lower core pin 78L may be either horizontally disposed, or diagonally disposed as shown in FIGS. 12–14.

An injection mold for molding the panel pocket with the locking tabs 30 may be constructed with similar knockout core pins for defining their molded shape at the pocket edge. As is well-known to those skilled in the art, the knockout core pins may be replaced by similarly notched action tools commonly called "lifters" that are located in the moveable mold tool and are operated together with other action core pieces by mechanisms in this mold tool to define the locking tab cavities on mold closure and to automatically lift free of and retract from the locking tabs following their molding to release the panel.

The invention has been described in an illustrative manner with respect to presently preferred embodiments, and the terminology that has been used is intended to be in the nature of words of description rather than words of limitation. Obviously, many modifications and variations of the present invention may be made in light of the above teachings. It is therefore to be understood that within the scope of the appended claims, the invention may be practiced otherwise than as specifically shown and described.

What is claimed is:

1. A molded thermoplastic automotive interior trim panel having a uniform wall thickness, said panel including an integral pocket that projects outwardly from an outer side of said panel, said pocket having a curved edge portion extending along a top margin thereof, said curved edge portion having a convex outer side and a concave inner side and an edge, said edge extending between said sides and facing inward of said pocket, a plurality of wedge-shaped locking tabs integral with said curved edge portion and spaced along the length thereof parallel to said edge, an extruded elastomeric thermoplastic pocket edge molding having a locking cavity with adjoining locking ribs extending the length thereof, said locking cavity adapted to receive said locking tabs, said locking ribs adapted to be deflected apart by said locking tabs to allow said locking tabs to forcibly enter said locking cavity and to then snap back to capture said locking tabs to lock said molding at said attaching side to said curved edge portion in conforming curved relationship therewith, said curved edge portion having a molding locating portion of uniform thickness extending along the length thereof, and said locking ribs further adapted to tightly clamp said molding locating portion while capturing said locking tabs to locate said molding in aligned locked relationship with said curved edge portion.

2. An automotive interior trim panel and extruded pocket edge molding as defined in claim 1 wherein said locking tabs are integral with and project outwardly from said sides of said curved edge portion and have a pointed end coextensive with said edge, and said molding is substantially wider than the thickness of said panel and extends completely over said edge of said curved edge portion and has opposing exterior wall edge portions extending outward of said locking ribs that are adapted to be deflected outward by and then clamp to said curved edge portion along the length thereof.

3. An automotive interior trim panel and extruded pocket edge molding as defined in claim 1 wherein said molding has an edge of uniform width that abuts with said edge of said curved edge portion and another edge of wider width that abuts with an inner side potion of said pocket adjacent said concave inner side portion, and said locking tabs are located between and project outward of said molding edges.

4. An automotive interior trim panel and extruded pocket edge molding as defined in claim 1 wherein said curved edge portion flares at a point and joins with said outer side of said panel at least one end of said curved edge portion, a close-off rib integral with an inner side of said flared edge portion at said point, said close-off rib having a shape conforming to the cross-sectional outline of said molding, and said molding having an end that flatly abuts with said close-off rib.

5. An automotive interior trim panel and extruded pocket edge molding as defined in claim 1 wherein said molding has an edge that abuts with said edge of said curved edge portion, said curved edge portion has a locking/locating rib integral with said inner concave side extending parallel to said edge of said curved edge portion, said locking tabs are integral with said locking/locating rib, said locking tabs have a pointed end coextensive with an edge of said locking/ locating rib, and said molding locating portion is defined by said locking/locating rib.

6. An automotive interior trim panel and extruded pocket edge molding as defined in claim 1 wherein said locking tabs are located on said sides of said curved edge portion at said edge, and said molding locating portion is defined by said sides of said curved edge portion from adjacent said edge of said curved edge portion to a substantial distance beyond said locking tabs.

7. An automotive interior trim panel and extruded pocket edge molding as defined in claim 2 wherein said locking tabs are located on both said sides of said curved edge portion with the locking tabs on one side staggered in relation to those on the other side, and said locking tabs having a pointed end coextensive with said edge.

8. An automotive interior trim panel and extruded pocket edge molding as defined in claim 5 wherein said locking tabs are located on opposite side of said locking/locating rib with the locking tabs on one side staggered in relation to those on the other side, and said locking tabs have a pointed end coextensive with an edge of said locking/locating rib.

9. An automotive interior trim panel and extruded pocket edge molding as defined in claim 3 wherein said molding has spaced co-planar surfaces as extruded located on opposite sides of said locking ribs that define said molding edges.

10. An automotive interior trim panel and extruded pocket edge molding as defined in claim 3 wherein a locking/ locating rib integral with and extending the length of said inner concave side of said curved edge portion defines said mold locating portion, and said locking tabs are located on opposite sides of said locking/locating rib.

11. An automotive interior trim panel and extruded pocket edge molding as defined in claim 5 wherein said ribs on said molding are contoured to nest in said inner concave side of said curved edge portion on opposite sides of said locking/ locating rib.

12. An automotive interior trim panel and extruded pocket edge molding as defined in claim 2 wherein said outer convex side of said molding at one of said exterior wall portions smoothly blends at a seam with said outer convex side of said curved edge portion.

13. An automotive interior trim panel and extruded pocket edge molding as defined in claim 4 wherein said close-off rib is located at an oblique angle to said edge and in the line of draw of an injection mold for molding said panel.

14. An automotive interior trim panel and extruded pocket edge molding as defined in claim 4 wherein said close-off rib is located at right angles to said edge and out of the line of draw of an injection mold for molding said panel.

15. An automotive interior trim panel and extruded pocket edge molding as defined in claim 1 wherein said sides of said curved edge portion adjacent said edge lie in horizontal planes and said edge extends vertically between said sides.

16. An automotive interior trim panel and extruded pocket edge molding as defined in claim 1 wherein said locking/ locating rib has a thickness substantially less than the wall thickness of said panel including said pocket.

17. An automotive interior trim panel and extruded pocket edge molding as defined in claim 2 wherein one of said exterior wall portions is relatively narrow and is contoured to smoothly blend with said convex outer side of said curved edge portion and the other of said exterior wall portions is relatively wide and is contoured to smoothly blend with an inner side portion of said pocket adjacent and below said curved edge portion.

* * * * *